No. 732,387. PATENTED JUNE 30, 1903.
J. B. WANTZ.
DENTAL ENGINE.
APPLICATION FILED FEB. 9, 1903.
NO MODEL.
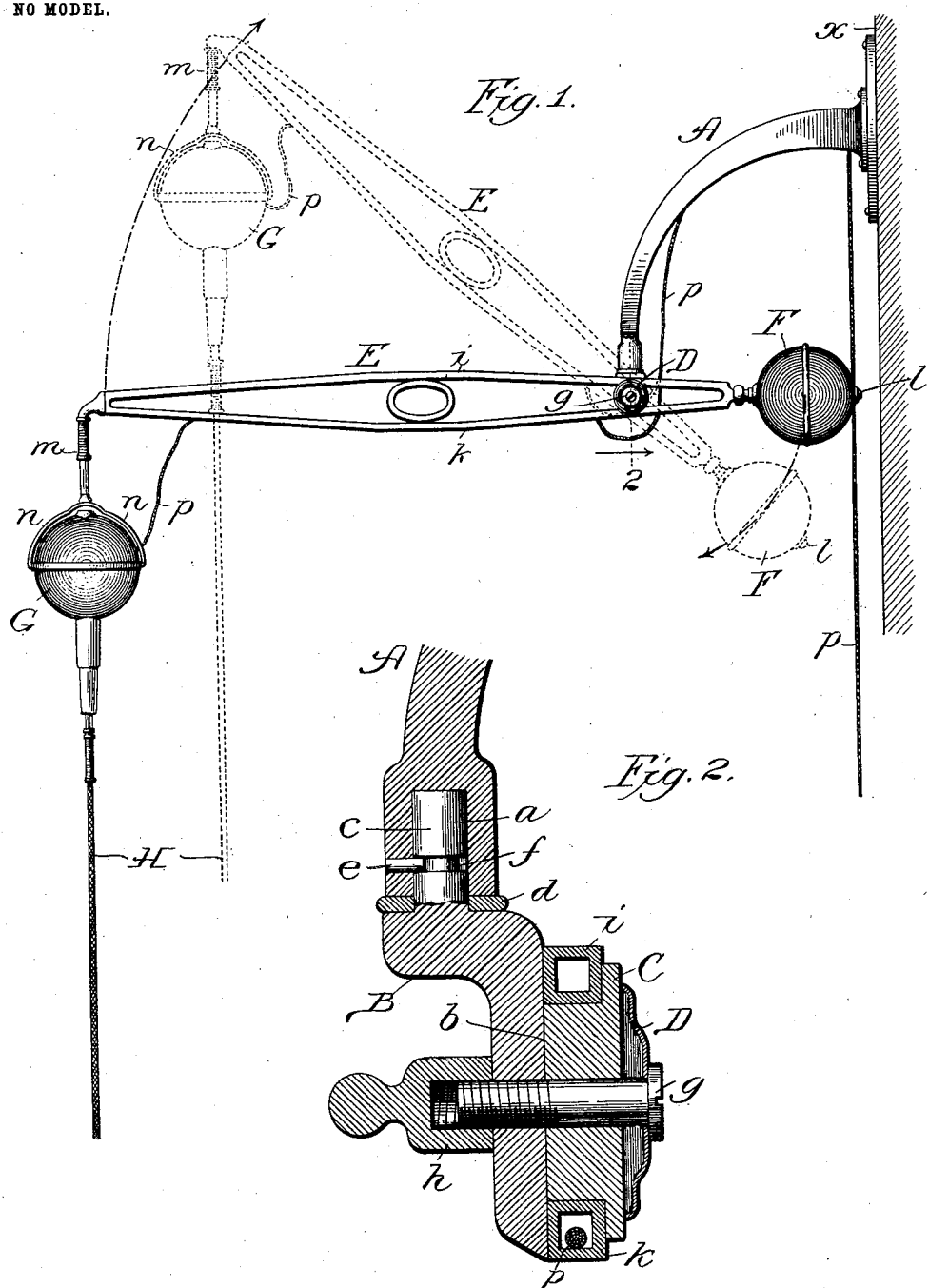
Witnesses:
Inventor:
Julius B. Wantz,
By Dyrenforth, Dyrenforth & Lee,
Att'ys.

No. 732,387.                                    Patented June 30, 1903.

UNITED STATES PATENT OFFICE.

JULIUS B. WANTZ, OF CHICAGO, ILLINOIS, ASSIGNOR TO VICTOR ELECTRIC COMPANY, A CORPORATION OF ILLINOIS.

DENTAL ENGINE.

SPECIFICATION forming part of Letters Patent No. 732,387, dated June 30, 1903.

Application filed February 9, 1903. Serial No. 142,562. (No model.)

*To all whom it may concern:*

Be it known that I, JULIUS B. WANTZ, a citizen of the United States, residing at Chicago, in the county of Cook and State of Illinois, have invented a new and useful Improvement in Dental Engines, of which the following is a specification.

My object is to provide a dental engine of improved construction for the purpose more especially of facilitating the use of the device and rendering it particularly convenient for dentists or other operators.

In carrying out my invention I mount the engine proper, preferably an electric motor, on the forward or free end of a counterbalanced lever, the connection between the lever and its support being in the nature of a universal joint to permit ready movement of the lever in planes at right angles to each other and give it desired stability in any adjusted position, all the connections being such as to permit the flexible shaft extension of the motor to be moved in any direction and to any position with desired freedom.

In the drawings, Figure 1 is a broken view showing my improved supporting-bracket, moving parts being shown in one position by full lines and in a raised position by dotted lines; and Fig. 2, an enlarged and broken section taken on the line 2 in Fig. 1.

A is a stationary arm or bracket adapted to be fastened against a wall X or to be secured in place in any other convenient way. In the free end of the bracket is a vertical cylindrical bearing-socket $a$.

B is a bearing-block presenting a flat vertical face $b$ and having a central upward-projecting cylindrical stud $c$ fitting the socket $a$ to rotate therein. Interposed between the block and bracket is a washer $d$, and the parts are held against separation by the engagement of a pin $e$ in the bracket with an annular groove $f$ in the stud $c$. Fitting against the face $b$ is a disk C, journaled upon a bolt $g$, which passes through an opening in the block B into a nut $h$. Interposed between the head of the bolt and face of the disk C is an elastic cup-shaped friction-disk D, which bears against the disk to prevent too ready turning thereof on the bolt.

E is a lever, which consists of the upper and lower tubes $i$ $k$, coming together at opposite ends, as shown. The tubes extend near one end across the upper and lower sides of the disk or fulcrum-block C, being permanently fastened thereto. On the end of the rear or short arm of the lever is a rod or extension $l$, carrying a spherical counterweight F. Hanging from the free end of the forward or long arm of the lever E is a flexible suspending medium $m$, carrying a bail or stirrup $n$.

G is the spherical casing of an electric motor, pivotally mounted at opposite sides midway between its upper and lower ends between the ends of the bail $n$ to swing freely therein. The armature-shaft of the motor has a coupling at its lower end to engage with the flexible shaft extension H. The block B turns in the bearing $a$ to permit the lever E to be swung to any position in the horizontal plane. The weight F counterbalances the long arm of the lever, with the motor G and shaft H suspended therefrom. The friction-cup D presses yieldingly against the disk C, to which the lever is rigidly secured, and thus prevents too ready swinging of the lever in the vertical plane. The operator may lower the lever to any position by pulling downward upon the flexible shaft H, while by forcing the said shaft upward the lever will rise to any position desired. The object of the friction-cup is to give to the lever desired stability in any position to which it is moved by the operator. The pressure of the friction-cup may be increased or diminished by turning the bolt $g$ in the nut $h$.

The conducting-wires $p$ extend along the arm A, as shown, and into the tube $k$ near the fulcrum, passing out of the tube at a point adjacent to the motor.

My improved construction provides a supporting-bracket which is particularly convenient and always under perfect control. It is strong and durable and attractive in appearance.

The motor G by being freely suspended and pivotally mounted in the bail $n$ adapts itself to every movement of the operator. A slight upward movement of the flexible shaft causes the lever to ascend, and it may be swung in either direction to be out of the way when not in use.

What I claim as new, and desire to secure by Letters Patent, is—

1. In a dental engine, the combination of a support, a counterbalanced arm thereon having a vertical and a horizontal movement, means permitting such movements comprised of a member swiveled to the support to rotate in a horizontal plane, and a pivot connecting the member and arm to allow movement of the latter in a vertical plane, and a motor on one end of the arm.

2. In a dental engine, the combination of a stationary support, a member swiveled thereto to rotate in a horizontal plane, an arm swiveled to said member to rotate in a vertical plane, a motor on one end of the arm and a counterbalance-weight on the opposite end of the arm.

3. In a dental engine, the combination with a stationary support, a member swiveled thereon to turn in a horizontal plane, a disk swiveled on the member to turn in a vertical plane, an arm mounted on the disk at a point intermediate of its length to be swung in a horizontal plane by the movement of the member and to be raised and lowered in a vertical plane in the movement of the disk, a motor on the forward end of the arm and a counterbalance on the rear end thereof.

JULIUS B. WANTZ.

In presence of—
WALTER WINBERG,
WM. B. DAVIES.